(12) United States Patent  
Zhang

(10) Patent No.: US 8,085,529 B2
(45) Date of Patent: Dec. 27, 2011

(54) BUTTON STRUCTURE AND ELECTRONIC DEVICE USING THE SAME

(75) Inventor: Yu Zhang, Shenzhen (CN)

(73) Assignees: Shenzhen Futaihong Precision Industry Co., Inc., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 142 days.

(21) Appl. No.: 12/749,650

(22) Filed: Mar. 30, 2010

(65) Prior Publication Data

US 2011/0026199 A1 Feb. 3, 2011

(30) Foreign Application Priority Data

Aug. 3, 2009 (CN) .......................... 2009 1 0305132

(51) Int. Cl.
*H05K 5/00* (2006.01)
*H05K 7/00* (2006.01)
*H04M 1/00* (2006.01)
*G11B 17/00* (2006.01)

(52) U.S. Cl. ......... 361/679.01; 361/679.02; 361/679.55; 361/679.56; 361/679.57; 361/679.58; 455/575.1; 455/575.3; 455/575.4; 455/575.8; 369/253

(58) Field of Classification Search ............. 361/679.01, 361/679.02, 679.08, 679.09, 679.3, 679.55–679.59; 455/575.1, 575.3, 575.4, 575.8; 369/282, 369/291, 253, 44.16, 75.5

See application file for complete search history.

(56) References Cited

U.S. PATENT DOCUMENTS 7,751,181 B2 * 7/2010 Chen .......................... 361/679.01
2008/0318646 A1 * 12/2008 Lin ............................. 455/575.4

* cited by examiner

*Primary Examiner* — Jayprakash N Gandhi
*Assistant Examiner* — Jerry Wu
(74) *Attorney, Agent, or Firm* — Altis Law Group, Inc.

(57) ABSTRACT

A button structure for a portable electronic device includes a button and a latching member, the button includes a plate portion and an extending arm, the button has a resisting block formed. The latching member includes a plate body and a branch, the plate body defines a guiding slot, the branch is bendable elastically corresponding to the plate body and has a wedge formed, the wedge is configured for latching with a housing of an electronic device. After the button structure is assembled, the distal end of the extending arm is secured to the plate body, the resisting block passes through the guiding slot. When the button is pressed, the resisting block moves together with the button to urge the wedge remove from the housing.

17 Claims, 4 Drawing Sheets

BUTTON STRUCTURE AND ELECTRONIC DEVICE USING THE SAME

BACKGROUND

1. Technical Field

The disclosure relates to button structures and electronic devices; and particularly to a button structure assembled in a portable electronic device to latch a battery cover with a housing.

2. Description of Related Art

Very common today, are portable electronic devices, such as mobile phones. A housing for such devices typically has a power button, for powering the device on and off and a latch for opening and closing the housing, for the replacement of batteries.

The power button and the latch take up space in the housing and make the structure of the portable electronic device very complicated.

Therefore, there is room for improvement within the art.

BRIEF DESCRIPTION OF THE DRAWINGS

Many aspects of the present disclosure can be better understood with reference to the following drawings. The components in the various drawings are not necessarily drawn to scale, the emphasis instead being placed upon clearly illustrating the principles of the present disclosure. Moreover, in the drawings, like reference numerals designate corresponding parts throughout the diagrams.

DETAILED DESCRIPTION

Figure 1:
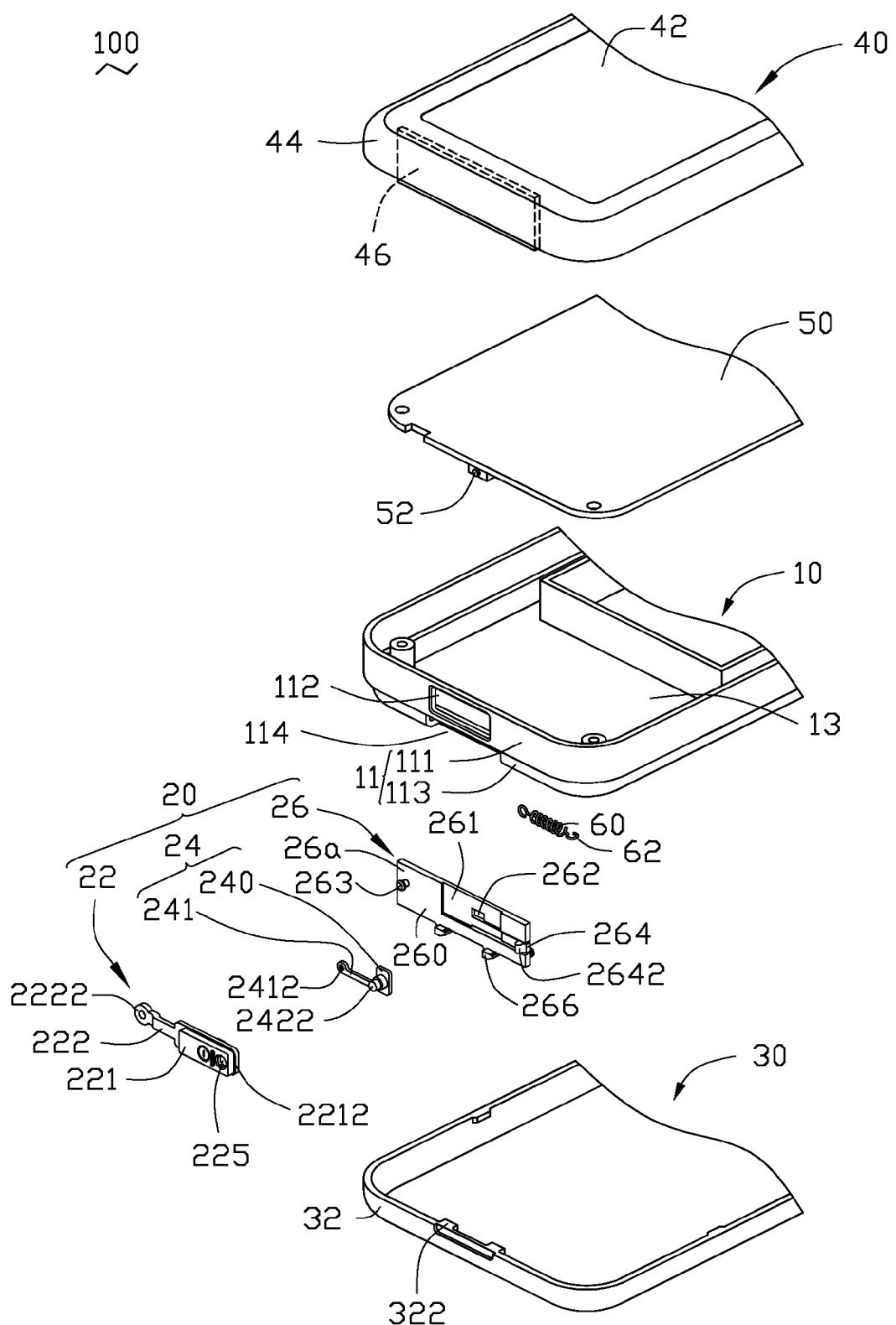
FIG. 1 is an exploded view of a portable electronic device having a button structure as disclosed.
Figure 2:
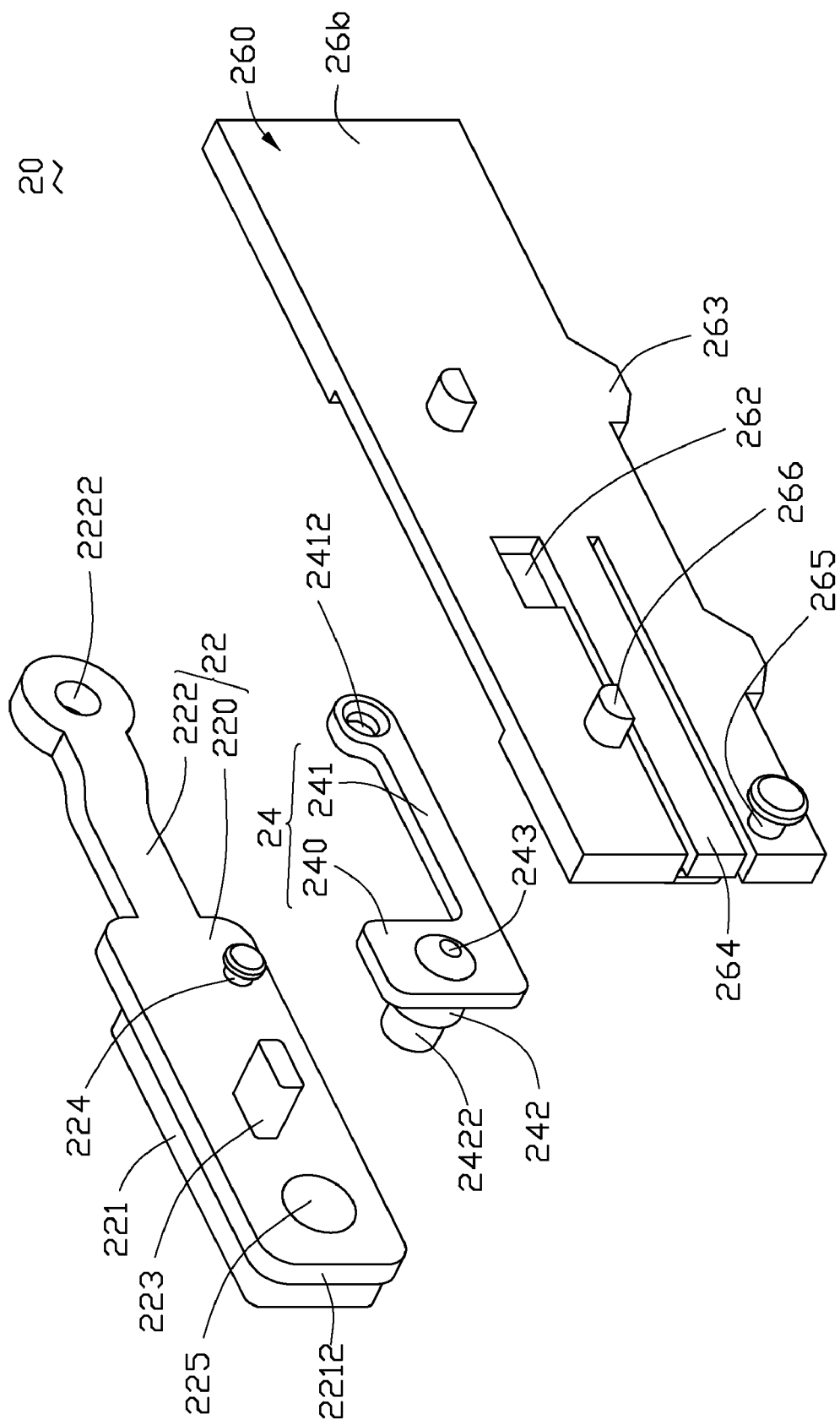
FIG. 2 is an exploded view of the button structure shown in FIG. 1 viewed from another angle.

FIGS. 1 and 2 show an exploded view of an exemplary embodiment of a button structure used in a portable electronic device such as a mobile phone, PDA (personal digital assistant), etc. The mobile phone 100 includes a housing 10, a button structure 20, a battery cover 30, a top cover 40, a circuit board 50, and an elastic member 60.

Figure 4:
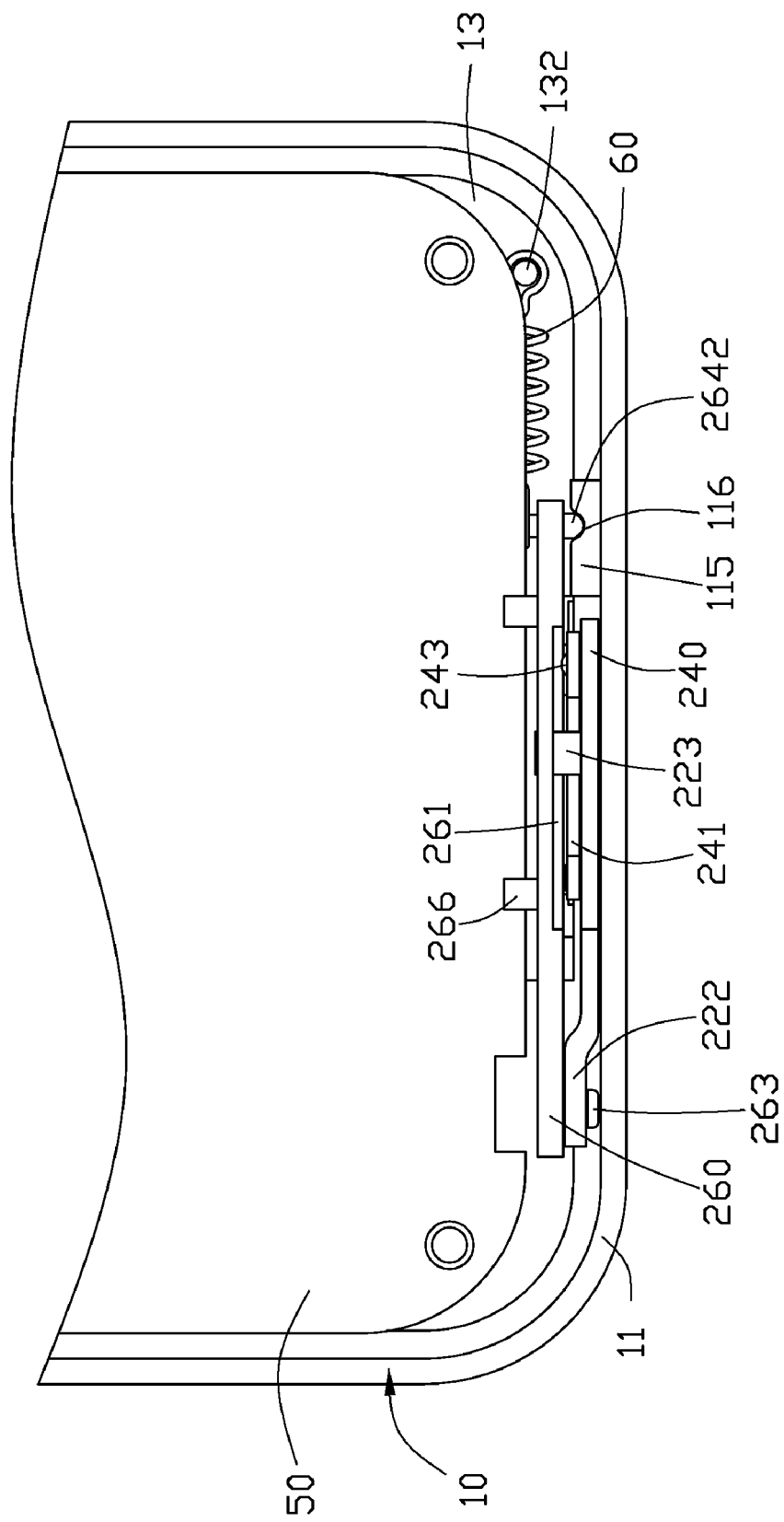
FIG. 4 is a schematic view of the electronic device with the top cover removed.

The housing 10 includes a first end wall 11 and a bottom wall 13, the first end wall 11 is ridged and includes an upper wall portion 111 and a lower wall portion 113. The upper wall portion 111 defines a mounting hole 112. The mounting hole 112 is generally rectangular, runs through the first end wall 11, and engages with the button structure 20. The lower wall portion 113 defines a locking hole 114. The locking hole 114 is located below the mounting hole 112 and runs through the first end wall 11 also. The locking hole 114 engages with the button structure 20 and the battery cover 30. Referring further to FIG. 4, the upper wall portion 111 has a protrusion 115 that protrudes from the inner side surface to one side of the mounting hole 112. The upper wall portion 111 defines an engaging recess 116 facing the opposite end of the housing 10. The engaging recess 116 is arcuate and engages with button structure 20. The bottom wall 13 has a first connecting pole 132 formed at a corner thereof. The first connecting pole 132 configures for engaging with the button structure 20.

Referring to FIG. 2, the button structure 20 includes a button 22, an engaging member 24, and a latching member 26. The button 22 is made of an elastic material such as rubber and includes a plate portion 220 and an extending arm 222 extending from one end of the plate portion 220. The plate portion 220 is slightly longer than the mounting hole 112. The plate portion 220 has a protruding block 221 protruding from a surface thereof and forms a peripheral flange 2212 around the plate portion 220. The protruding block 221 is shorter than the mounting hole 112. The plate portion 220 has a resisting block 223 and a post 224 protruding from another surface opposite to the protruding block 221. The resisting block 223 is located at the middle of the plate portion 220 and engages with the latching member 26. The post 224 is located at an end of the plate portion 220 and adjacent to the extending arm 222 for attaching with the engaging member 24. The plate portion 220 defines an engaging hole 225 adjacent to another end of the plate portion 220. The engaging hole 225 runs through the plate portion 220, and engages with the engaging member 24. The extending arm 222 bends corresponding to the plate portion 220. The extending arm 222 defines a connecting hole 2222 at the distal end thereof. The connecting hole 2222 engages with the latching member 26.

The engaging member 24 includes a base plate 240 and an extension arm 241 extending from aside of the base plate 240. The base plate 240 has a pressing pole 242 protruding from a surface. The pressing pole 242 is receivable in the engaging hole 225 of the plate portion 220. The pressing pole 242 has a pressing end 2422. A convex 243 is formed on the opposite surface of the base plate 240, and resists against the latching member 26. The extension arm 241 is elastic and bendable relative to the base plate 240. The extension arm 241 defines a fixing hole 2412 at the distal end thereof. The fixing hole 2412 engages with the post 224 of the plate portion 220 to secure the engaging member 24 to the button 22.

The latching member 26 is generally rectangular and includes a plate body 260. The plate body 260 has a first surface 26a and an opposite second surface 26b. The first surface 26a defines a receiving recess 261 and a guiding slot 262 at the bottom of the receiving recess 261. The receiving recess 261 is shorter than the plate portion 220 of the button 22 and receives the engaging member 24. The guiding slot 262 engages with the resisting block 223 of the plate portion 220. The first surface 26a has a connecting post 263 adjacent to an end thereof. The connecting post 263 is engageable with the connecting hole 2222 of the extending arm 222. The plate body 260 defines two parallel slits (not labeled) to form a branch 264. The branch 264 extends parallelly with the bottom side of the plate body 260 with an end of the branch 264 extends to the center of receiving recess 261 and the other end of the branch 264 extends to the side of the plate body 260. The branch 264 is elastic and has a wedge 2642 formed on the distal end. The wedge 2642 projects relative to the first surface 26a and is configured for engaging with the engaging recess 116 of the housing 10. The second surface 26b forms a second connecting pole 265 and two protuberances 266. The second connecting pole 265 is adjacent to an end of the plate body 260 connecting with an end of the elastic member 60. The two protuberances 266 located at two sides of the guiding slot 262 are used to resist downwardly the circuit board 50. The plate body 260 forms two parallel latching strips 266 at the bottom side. The latching strips 266 extend toward the button 22 to latch with the battery cover 30.

The elastic member 60 is a compression spring and includes a hook 62 at each of its two ends. The two hooks 62 connect with the first connecting pole 132 of the housing 10 and the second connecting pole 265 of the latching member 26.

The battery cover 30 covers the housing 10 and includes a second end wall 32 corresponding to the first end wall 11. The second end wall 32 engages with the lower wall portion 113 of the first end wall 11. The second wall 32 has two latching ribs 322 engaging with the two latching strips 266 of the plate body 260 correspondingly.

The top cover 40 is engageable with the housing 10 and includes a top wall 42 and a third end wall 44 corresponding to the first end wall 11. The top wall 42 has a guiding plate 46 protruding from the inner surface. The guiding plate 46 is positioned adjacent to and generally parallel with the third end wall 44. The guiding plate 46 is to resist against the latching member 26, and the latching member 26 can slide along the guiding plate 46.

The circuit board 50 can be received in the housing 10. The circuit board 50 has a power switch 52 formed at an end, the power switch 52 can be contacted by the resisting block 223 of the button 22 to power the mobile phone 100 on/off.

Referring to FIG. 1 and FIG. 4, to assemble the mobile phone 100, the button structure 20 is assembled. The engaging member 24 is mounted to the button 22, the pressing pole 242 of the engaging member 24 is inserted into the engaging hole 225 of the plate portion 220 and the pressing end 2422 is exposed from the engaging hole 225. The fixing bore 2412 of the extension arm 241 receives the post 224 of the plate portion 220, and the post 224 is secured in the fixing bore 2412 such as by of hot melting of a distal end of the post 224.

Then, the latching member 26 is assembled with the button 22 assembled in the engaging member 24 therein. The engaging member 24 is clipped between the button 22 and the latching member 26. The engaging member 24 is received in the receiving recess 261 of the plate body 260, and the convex 243 of the base plate 240 resists with an end of the branch 264. The resisting block 223 of the plate portion 220 passes through the guiding slot 262 of the plate body 260 and exposes out of the guiding slot 262. The connecting hole 2222 of the extending arm 222 receives the connecting post 263 of the plate body 260 therein, and the connecting post 263 is secured in the connecting hole 2222. Thus, the button structure 20 is assembled. The two latching strips 266 of the plate body 260 are located under the button 22.

The button structure 20 is assembled into the housing 10. The button 22 engages with the first end wall 11, and the protruding block 221 of the button 22 extends out of the mounting hole 112 of the first end wall 11 with the peripheral flange 2212 abuts the inner side of the first end wall 11. Due to the fact, the length of the protruding block 221 is shorter than the mounting hole 112, the protruding block 221 can slide in the mounting hole 112. At the same time, the wedge 2642 of the branch 264 resists with the engaging recess 116 of the protrusion 115, and the two latching strips 266 of the plate body 260 extend out of the latching hole 114 of the first end wall 11.

Then, the elastic member 60 is assembled in the housing 10 with the two hooks 62 connecting the first connecting pole 132 of the housing 10 and the second connecting pole 265 of the latching member 26 respectively.

The circuit board 50 is secured in the housing 10. An end having the power switch 52 of the circuit 50 only resists with the plate body 260, thus the circuit board 50 is positioned below the two protuberances 266 and above the branch 264. The resisting block 223 of the plate portion 220 aligns with the power switch 52. The button structure 20 is positioned between the first end wall 11 of the housing 10 and the circuit board 50.

The top cover 40 is latched with the housing 10 and covers the circuit board 50. At the same time, the guiding plate 46 of the top cover 40 abuts the plate body 260 of the latching member 26, and the guiding plate 46 can slide laterally along the plate body 260.

Figure 3:
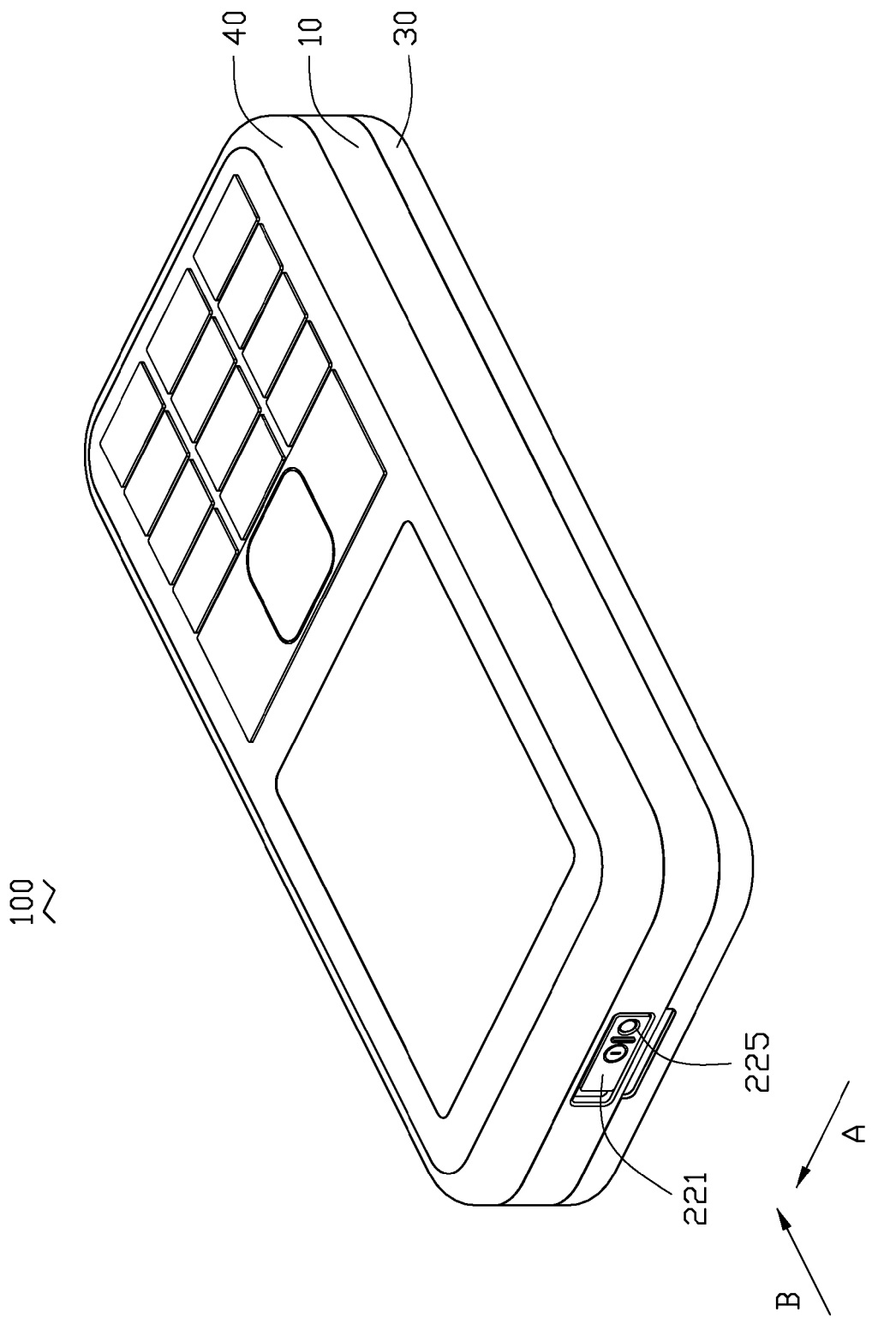
FIG. 3 is a schematic view of the electronic device assembled, the button structure shown in FIG. 1.

The pressing end 2422 of the pressing pole 242 is pressed toward the direction of B (shown in FIG. 3) until the pressing end 2422 enters into the engaging hole 225 completely, thereby, the convex 243 of the base plate 240 pushes the end of the branch 264. The wedge 2642 of the branch 264 is removed from the engaging recess 116 of the protrusion 115. Then, the button 22 is pushed along the direction of A. The button 22 slides and the latching member 26 moves with the sliding of the button 22, and the elastic member 60 stretches. The second end wall 32 of the battery cover 30 engages with the lower wall portion 113 of the first end wall 11. The two latching ribs 322 of the second wall 32 extend into the latching hole 114 of the first end wall 11. The button 22 releases and the elastic member 60 draws the button 22 back to the original position. Thus, the two latching strips 266 of the latching member 26 are positioned below the two latching ribs 322 and align with the two latching ribs 322. Accordingly, the battery cover 30 is latched by the button structure 20. The wedge 2642 of the branch 264 returns into the engaging recess 116.

Before opening the battery cover 30, to turn off the power of the mobile phone 100, the protruding block 221 of the button 22 is pressed along arrow B. The plate portion 220 and the engaging member 22, bend along with the distal end of the extending arm 222. The plate portion 220 moves towards the first surface 26a of the plate body 260 until the plate portion 220 resists with the first surface 26a. Accordingly, the resisting block 223 of the plate portion 220 contacts with the power switch 52 of the circuit board 50 to turn off the power of the mobile phone 100.

The protruding block 221 is released, the protruding block 221 and the engaging member 22 move back to the original position. After that, to open the battery cover 30, the process of opening the battery cover 30 repeats as described in previous paragraph. The pressing end 2422 is pressed along the arrow B until the pressing end 2422 enters into the engaging hole 225 completely. The wedge 2642 of the branch 264 is removed out of the engaging recess 116 of the protrusion 115. The button 22 is pushed along arrow A to discharge the latching between the two latching strips 266 of the latching member 26 with the two latching ribs 322 of the battery cover 30. In this case, the battery cover 30 can be opened easily from the housing 10 allowing the battery removal.

The mobile phone 100 can be turned on in a manner reverse to the turning-off process by pressing the protruding block 221 of the button 22.

It is understood that, the engaging member 24 can be omitted, accordingly, the post 224 and the engaging hole 225 of the plate portion 220 can be omitted. The plate portion 220 has a convex protruding from a surface and engaging with the branch 264 of the latching member 26. The convex is longer than the resisting block 223 of the plate portion 220.

It is to be understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A button structure for a portable electronic device, comprising:

a button including a plate portion and an extending arm extending from an end of the plate portion, the button being bendable elastically corresponding to the movement of the extending arm and having a resisting block formed;

a latching member including a plate body and a branch, the plate body defining a guiding slot, the branch having an end connecting with the plate body, the other end of the branch being bendable elastically corresponding to the movement of the plate body and having a wedge formed, the wedge for latching with a housing of an electronic device;

a convex positioned between the plate portion and the branch;

wherein a distal end of the extending arm is secured to the plate body, the resisting block passes through the guiding slot, and when the button is pressed, the resisting block moves together with the button, the convex is pushed by the button, and resists against the branch, to urge the wedge removing from the housing of an electronic device.

2. The button structure as claimed in claim 1, wherein the button structure includes an engaging member, the engaging member includes a base plate and an extension arm extending from the base plate, the base plate forms the convex to engage with the branch of the latching member, the distal end of the extension arm secures with the plate portion of the button.

3. The button structure as claimed in claim 2, wherein the plate portion defines an engaging hole, the base plate forms a pressing pole, the pressing pole has a pressing end, the pressing pole passes through the engaging hole and the pressing end is exposed.

4. The button structure as claimed in claim 3, the plate portion has a protruding block formed for pressing, the engaging hole runs through the protruding block.

5. The button structure as claimed in claim 2, wherein the plate body has a first surface, the first surface has a receiving recess defined to receive the engaging member, the branch is formed at the bottom of the receiving recess to resist against the convex.

6. The button structure as claimed in claim 1, wherein the plate body forms two latching strips to latch with a battery cover.

7. A portable electronic device, comprising:

a housing including a first end wall, the first end wall defining a mounting hole and a locking hole and forming an engaging recess in the inner side;

a button structure including a button and a latching member with an end of which being secured with the button, the button having a resisting block formed, the latching member having a wedge and at least one latching strip formed;

a circuit board has a power switch formed at an end thereof;

a battery cover including a second end wall engageable with the first end wall, the second end wall having at least one latching rib formed; and an elastic member to connect the latching member and the housing;

wherein the button structure, the circuit board and the battery cover are assembled in the housing, the button engages with the mounting hole, the resisting block aligns with the power switch of the circuit, the wedge of the latching member is received in the engaging recess, and the latching strip latches with the latching rib; and wherein pushing the button effects the power switch and disengages the wedge from the engaging recess, to release the latching strip from the latching rib.

8. The portable electronic device as claimed in claim 7, wherein the button includes a plate portion and an extending arm extending from an end of the plate portion, the button is bendable elastically corresponding to the movement of the extending arm.

9. The portable electronic device as claimed in claim 8, wherein a latching member includes a plate body and a branch, the plate body defines a guiding slot to receive the resisting block, an end of the branch connects with the plate body, the other end of the branch is bendable elastically corresponding to movement of the plate body and has the wedge formed, the wedge is towards to the first end wall.

10. The portable electronic device as claimed in claim 9, wherein the button structure further includes an engaging member, the engaging member includes a base plate and an extension arm extending from a side of the base plate, the base plate is bendable corresponding to movement of the extension arm, the distal end of the extension arm is secured to the plate portion of the button, the base plate forms a convex on a surface thereof, the convex resists an end of the branch of the latching member.

11. The portable electronic device as claimed in claim 10, wherein the plate body has a first surface, the first surface has a receiving recess defined to receiving the engaging member, an end of the branch is located at the bottom of the receiving recess, the convex of the engaging member resists with the branch.

12. The portable electronic device as claimed in claim 10, wherein the plate portion of the button defines an engaging hole, the base plate forms a pressing pole on the other surface opposite to the convex, the pressing pole has a pressing end, after the engaging member is assembled with the button, the pressing pole passes through the engaging hole and the pressing end is exposed.

13. The portable electronic device as claimed in claim 12, wherein the plate portion has a protruding block to engage with the mounting hole, the protruding block is used for pressing by the user, the engaging hole also runs through the protruding block.

14. The portable electronic device as claimed in claim 10, wherein the plate body has a second surface opposite to the first surface, the second surface has two protuberances formed to resist with the circuit board.

15. The portable electronic device as claimed in claim 7, wherein housing includes a bottom wall, the bottom wall forms a first connecting pole, the second surface of the plate body forms a second connecting pole, the elastic member has a hook at each end, the two hooks connect with the first connecting pole and the second connecting pole respectively.

16. The portable electronic device as claimed in claim 7, wherein the first end wall is stepped and includes an upper wall portion and a lower wall portion, the upper wall portion defines the mounting hole and the lower wall portion defines the locking hole under the mounting hole.

17. The portable electronic device as claimed in claim 7, wherein the portable electronic device includes a top cover to engage with the housing, the top cover includes a guiding plate, the guiding plate is used to resist the latching member and guide the latching member sliding.

* * * * *